(12) United States Patent
Zhu

(10) Patent No.: US 7,025,335 B2
(45) Date of Patent: Apr. 11, 2006

(54) MODULAR FENCE

(76) Inventor: Alan Qing Zhu, 8057 Indigo Ct., Alta Loma, CA (US) 91701

( * ) Notice: Subject to any disclaimer, the term of this patent is extended or adjusted under 35 U.S.C. 154(b) by 0 days.

(21) Appl. No.: 10/659,104

(22) Filed: Sep. 9, 2003

(65) Prior Publication Data

US 2004/0046162 A1    Mar. 11, 2004

Related U.S. Application Data

(63) Continuation-in-part of application No. 10/087,258, filed on Mar. 1, 2002, now Pat. No. 6,648,304.

(51) Int. Cl.
*E04H 17/14* (2006.01)

(52) U.S. Cl. .............. 256/22; 256/21; 256/59; 256/65.01; 256/73; 403/252; 403/264; 403/329

(58) Field of Classification Search ........... 256/21, 256/22, 59, 65.01, 65.07, 73; 403/252, 264, 403/73, 329
See application file for complete search history.

(56) References Cited

U.S. PATENT DOCUMENTS

| | | | | |
|---|---|---|---|---|
| 998,582 | A * | 7/1911 | Lucas | 403/252 |
| 2,779,561 | A * | 1/1957 | Blundeau | 403/108 |
| 3,942,763 | A * | 3/1976 | Helterbrand et al. | 256/22 |
| 4,014,520 | A * | 3/1977 | Walters | 256/22 |
| 4,691,897 | A * | 9/1987 | Frush | 256/65.13 |
| 4,898,365 | A * | 2/1990 | Conner et al. | 256/22 |
| 4,982,933 | A * | 1/1991 | Schultz | 256/22 |
| 5,443,244 | A * | 8/1995 | Gibbs | 256/22 |
| 5,660,378 | A * | 8/1997 | Schall | 256/22 |
| 5,873,564 | A * | 2/1999 | Bisch | 256/65.12 |
| 5,931,450 | A * | 8/1999 | Yoder | 256/65.01 |
| 6,631,887 | B1 * | 10/2003 | Walmsley | 256/22 |
| 6,648,304 | B1 * | 11/2003 | Zhu | 256/22 |
| 6,824,123 | B1 * | 11/2004 | Larsen et al. | 256/22 |

FOREIGN PATENT DOCUMENTS

JP            08170451 A   *   7/1996

* cited by examiner

*Primary Examiner*—Daniel P. Stodola
*Assistant Examiner*—Ernesto Garcia
(74) *Attorney, Agent, or Firm*—Thomas I. Rozsa; Tony D. Chen

(57) ABSTRACT

A modular picket fence including a pair of vertical separated posts and adapted to be secured to a suitable support surface. A pair of horizontal upper and lower rails extend between and secured to the vertical posts. The upper rail has a plurality of apertures which are aligned with a plurality of apertures on the lower rail. A plurality of vertical pickets are respectively inserted through into aligned apertures of the upper and lower rails. The end portion of each vertical picket has two transverse apertures. A locking member is assembled inside each end portion of the vertical picket. The locking member has spring biased stoppers extending through the transverse apertures at the end portion of the vertical picket, and further extending into and engaging inside the horizontal rail when the end portion of the vertical picket is inserted into one of the apertures of the horizontal rail.

3 Claims, 10 Drawing Sheets

MODULAR FENCE

This Patent Application is a continuation in-part of patent application Ser. No. 10/087,258 filed on Mar. 1, 2002, now U.S. Pat No. 6,648,304.

BACKGROUND OF THE INVENTION

1. Field of the Invention

The present invention relates generally to the field of fences. More particularly, the present invention relates to the field of modular picket fences.

2. Description of the Prior Art

Specifically, prior art wrought iron fences are well known in the art. These prior art wrought iron fences have become especially popular in recent years as protective fencing around swimming pools, gardens and serve as security barriers around patios and entryways. The wrought iron fences are formed from rods or tubes of metal which are welded to upper and lower rails to form panels or sections. The panels are either welded between upright metal posts or bolted to the upright posts. The iron fences are sturdy but have a number of problems such as the welded areas are susceptible to rusting even when painted and if galvanized components are used the welding destroys the coating at the welded area that leads to rust. The wrought iron fences are usually assembled and joined together at the job site and require considerable skill and time on the part of the professional artisans. For this reason, they are relatively expensive.

The following six (6) prior art patents are found to be pertinent to the field of the present invention:

1. U.S. Pat. No. 1,664,080 issued to Mapson on May 6, 1926 for "Ornamental Iron Stair Rail Structure" (hereafter "Mapson");
2. U.S. Pat. No. 3,067,985 issued to Cusack on Mar. 29, 1961 for "Picket Fence" (hereafter "Cusack");
3. U.S. Pat. No. 5,150,885 issued to Leone on Sep. 29, 1992 for "Picket Fence Assembly" (hereafter "Leone");
4. U.S. Pat. No. 5,443,244 issued to Gibbs on Aug. 22, 1995 for "Rolled Metal Fence Rail" (hereafter "Gibbs");
5. U.S. Pat. No. 5,882,001 issued to Reinbold on Mar. 16, 1999 for "Modular Fence Structure" (hereafter "Reinbold"); and
6. U.S. Pat. No. 6,053,481 issued to Scheide on Apr. 25, 2000 for "Security Fence Rail Bracket" (hereafter "Scheide").

Mapson discloses an ornamental iron stair rail structure with means of securing the separate members of the side railing of stairs together.

Cusack discloses a modular picket fence having horizontal rails and vertical pickets interconnected by a plurality of bolt and nut sets. However, each bolts and nuts set (40, 42 and 44) must be separately and individually fastened, which is very laborious and time consuming.

Leone discloses a picket fence assembly which comprises an upper rail, a lower rail and a plurality of vertically disposed pickets. Each rail has a plurality of non-circular apertures that extend therethrough in substantial vertical alignment. Each picket extends through one of the apertures in the upper rail and through one of the aligned apertures in the lower rail. The pickets have upper and lower indentations for engaging the upper and lower rails. The pickets are respectively held in the apertures and are axially movable in the apertures to a locking position at which the indentations in the pickets are engaged by the rails and axial movement of the pickets relative to the rails is prevented. The rails are provided with a frictional locking means, such that the pickets are engaged in a frictional fit therewith in the locking position wherein rotational movement of the pickets is restrained. The frictional locking means comprises a plurality of paired opposed indentations in the flanges of the rails. The indentations conform with the perimeter configuration of the pickets in the locking position.

Gibbs discloses a rolled metal rail that is incorporated into a picket fence which utilizes multiple such rails.

Reinbold discloses a modular fence structure which includes a plurality of posts having vertically spaced ribs on confronting surfaces for supporting the respective end portion of inverted U-shaped rails. The rails have a plurality of longitudinally equally spaced vertically aligned apertures with each aperture having a tab portion of the U-shaped rail bight portion projecting into the aperture. A plurality of pickets are cooperatively received by the respective aligned apertures with each picket having a pair of transverse longitudinally spaced slots in its wall cooperatively nesting a respective tab projecting into each slot. An inverted L-shaped spring clip enters the respective aperture on that side of the post opposite its slot to engage upper and lower surfaces of the bight portion of the respective rail adjacent the aperture and lock the respective picket against movement relative to the rails.

Scheide discloses a security fence rail bracket for supporting a fence rail which includes a hollow body with an open-topped cavity and an end wall with a cross-shaped aperture through which a bolt is passed into a fence post. The angularity of the body with respect to the post surface is adjusted by installing one or more tapered spacers between the body and the post. The spacers have nesting bosses and recesses, and offset slots through which the bolt passes.

It is desirable to provide a modular picket fence which may be formed from metal or other materials and easily and conveniently assembled on the job site by a professional or homeowner. It is also desirable to provide a modular picket fence which includes separate interconnecting modular parts that can be assembled together without any welding or using special tools or equipment, thereby reducing costs and lowing assembled labor.

SUMMARY OF THE INVENTION

The present invention is a unique modular picket fence.

The modular picket fence comprises a pair of vertical posts positioned at a suitable distance and adapted to be secured to a suitable support surface. At least one horizontal upper and lower rails extend between and secured to the vertical posts. The horizontal upper rail has a plurality of vertical apertures which are substantially aligned with a plurality of vertical apertures on the horizontal lower rail. A plurality of vertical pickets are respectively inserted through the vertical apertures of the upper rail and through aligned vertical apertures of the lower rail. Each picket has at least two transverse locking slotted apertures for respectively receiving an H-shaped locking clip to secure the picket to the rail.

It is an object of the present invention to provide a modular picket fence which has a decorative and functional enclosure for any physical area formed from modular components permitting a complete customized fencing section which may be erected at the installation site, preferably from prefabricated metallic material.

It is an additional object of the present invention to provide a modular picket fence in the form that may be readily assembled from a set of modular components by a person or homeowner of ordinary skill and experience without the use of welding equipment or other special tools.

It is a further object of the present invention to provide a modular picket fence which the manufactured components are reduced to a small number of very simple and inexpensive components.

It is a further object of the present invention to provide a modular picket fence which includes an insertable locking means that engages the picket and rail for precluding vertical movement of the pickets with respect to the rails.

Further novel features and other objects of the present invention will become apparent from the following detailed description, discussion and the appended claims, taken in conjunction with the drawings.

BRIEF DESCRIPTION OF THE DRAWINGS

Referring particularly to the drawings for the purpose of illustration only and not limitation, there is illustrated.

DETAILED DESCRIPTION OF THE PREFERRED EMBODIMENTS

Although specific embodiments of the present invention will now be described with reference to the drawings, it should be understood that such embodiments are by way of example only and merely illustrative of but a small number of the many possible specific embodiments which can represent applications of the principles of the present invention. Various changes and modifications obvious to one skilled in the art to which the present invention pertains are deemed to be within the spirit, scope and contemplation of the present invention as further defined in the appended claims.

Described briefly, the present invention is a modular picket fence. In the first arrangement of the present invention, the modular picket fence may be assembled with a pair of horizontal upper rails and one horizontal lower rail as shown in FIGS. 1, 2, 6(f), and 6(g). In the second arrangement of the present invention, the modular picket fence may be assembled with at least one horizontal upper rail and at least one horizontal lower rail as shown in FIGS. 6(a)–6(e).

Figure 1:
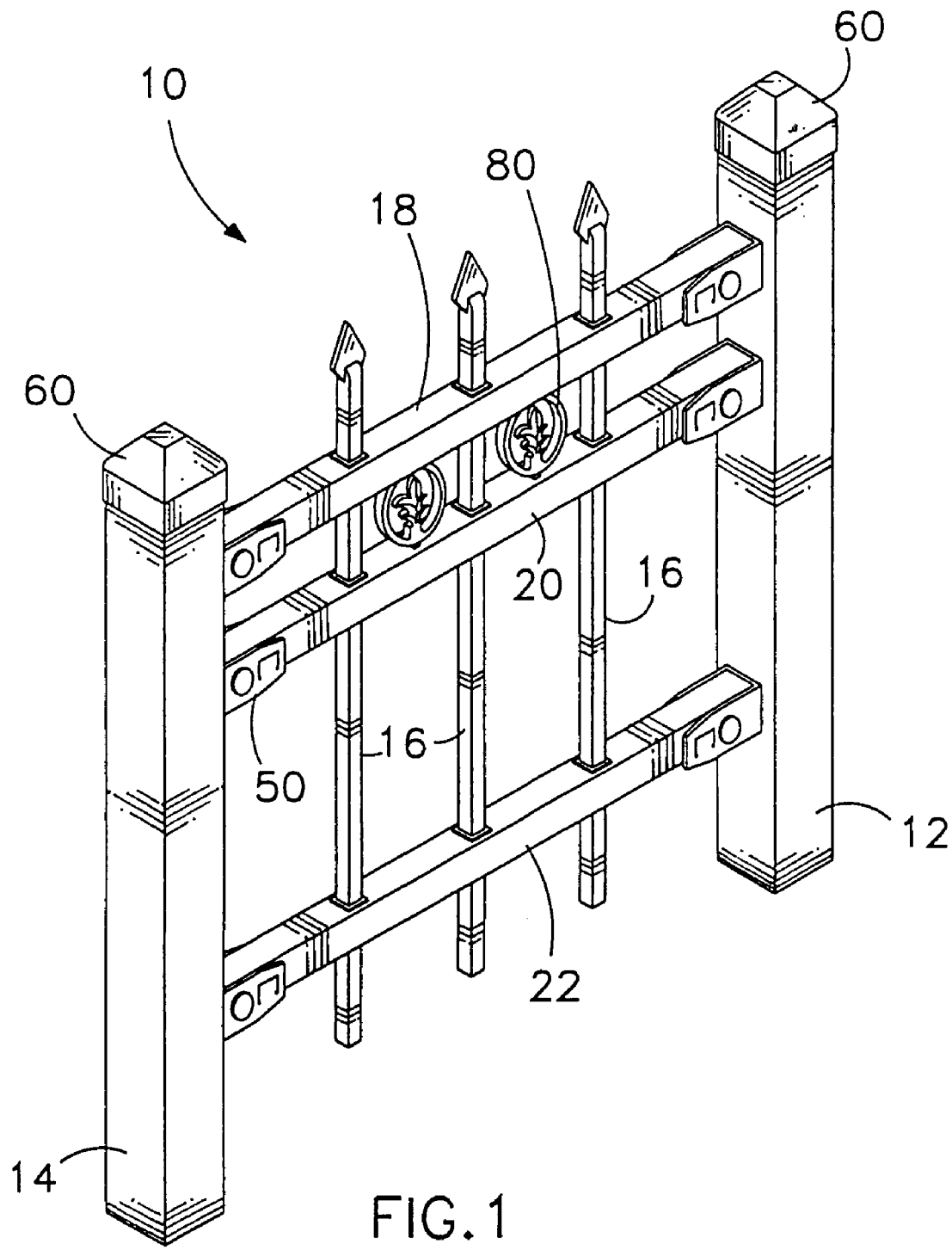
FIG. 1 is a perspective view of the preferred embodiment of a fully assembled modular picket fence in accordance with the present invention.

Referring to FIG. 1, there is shown at 10 a first arrangement of the present invention modular picket fence which comprises a pair of hollow vertical posts or columns 12 and 14 usually spaced apart approximately 6–8 feet and positioned to be secured to a support surface or any other suitable surface, a plurality of hollow vertically disposed pickets or poles 16 which have pointed ends, a pair of spaced apart elongated hollow horizontal upper rails 18 and 20, and an elongated hollow horizontal lower rail 22. In the example shown, the posts 12 and 14 are square shaped tubular but obviously may be of other cross-sectional configuration as desired.

Figure 3:
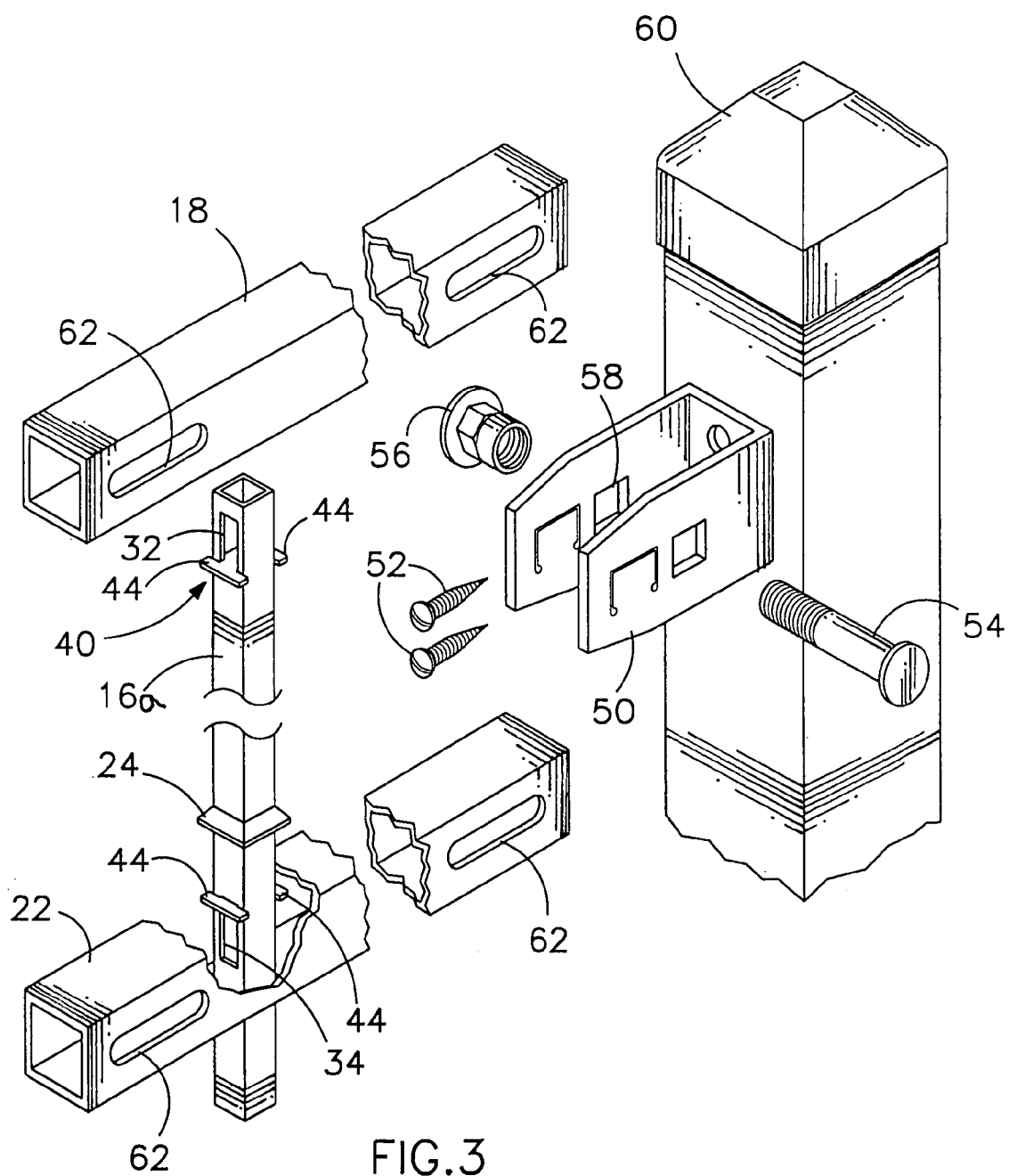
FIG. 3 is a partial enlarged exploded perspective view of an alternative embodiment of the present invention modular picket fence shown in FIG. 1.
Figure 6:
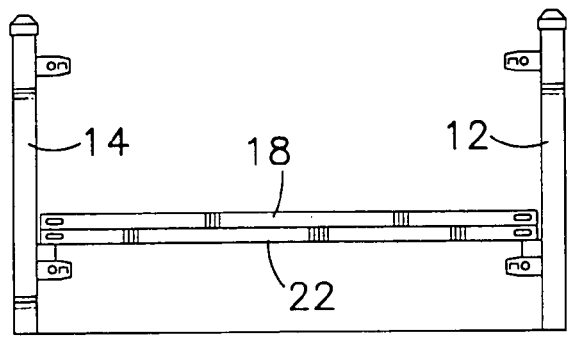
FIGS. 6(a) through 6(e) illustrates how the modular picket fence is assembled in accordance with the present invention.
FIG. 6(f) is a side elevational view of another arrangement of the modular picket fence in accordance with the present invention.
FIG. 6(g) is a side elevational view of a further arrangement of the modular picket fence in accordance with the present invention.
Figure 6:
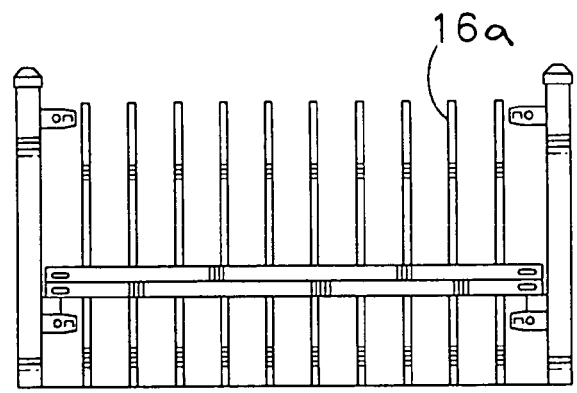
Figure 6:
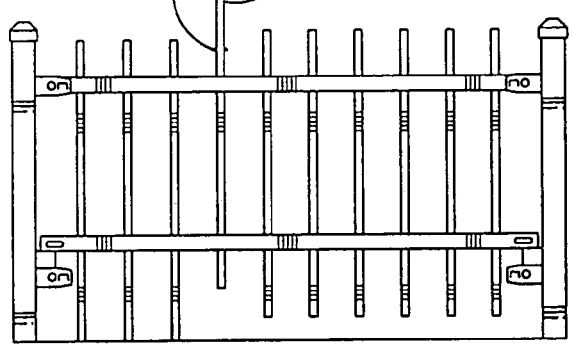
Figure 6:
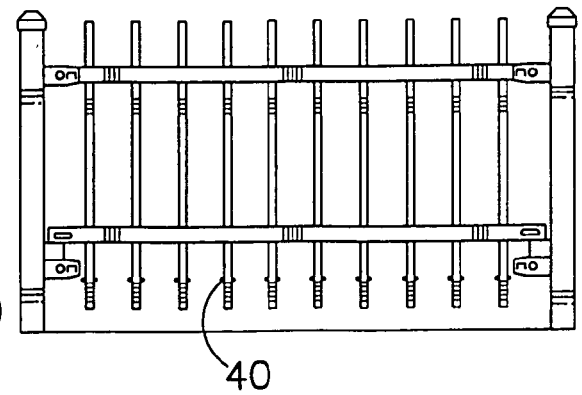
Figure 6:
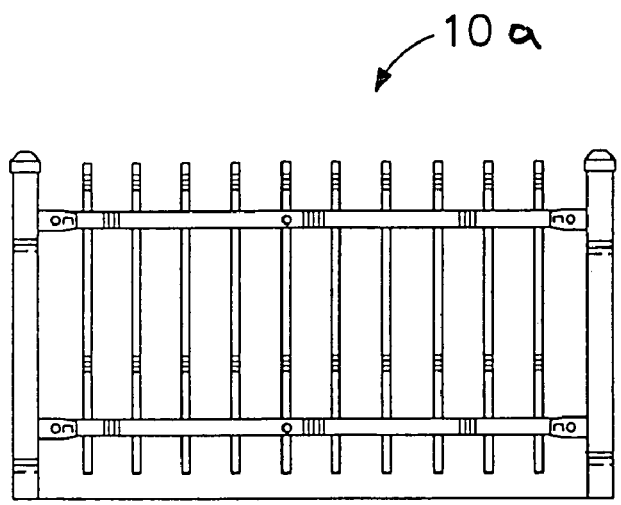
Figure 6:
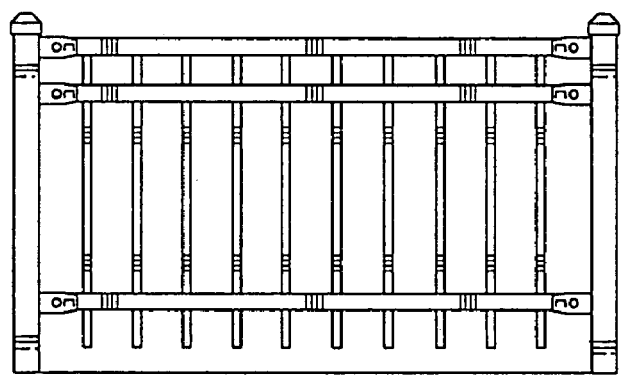
Figure 6:
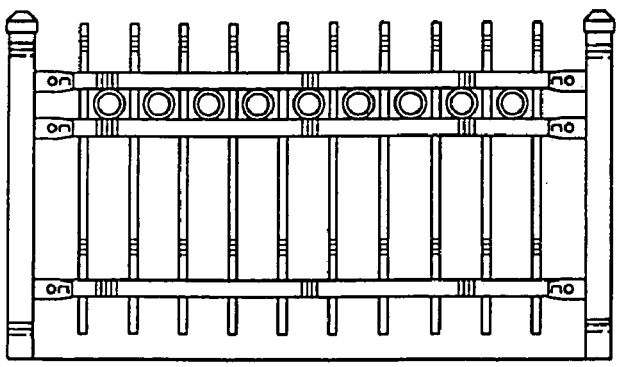

For clarity purposes, only three vertical pickets 16 are illustrated. It will be appreciated that the vertical pickets 16 are not limited to the number of pickets illustrated in FIG. 1. In addition, pickets without pointed ends, numbered 16(a) as illustrated in FIGS. 3, 6(b) and 6(c), are also within the spirit and scope of the present invention. It is emphasized that while the three vertical pickets are depicted, it is also within the spirit and scope of the present invention to have a plurality of vertical pickets which can be used as shown in FIGS. 6(b)–6(g). It will also be appreciated that at least one elongated horizontal upper rail 18 and at least one elongated horizontal lower rail 22 can be used with the present invention modular fence assembly as shown in FIGS. 6(a)–6(e). The fence configuration illustrated in FIG. 6(e) has been designated as 10(a).

Figure 2:
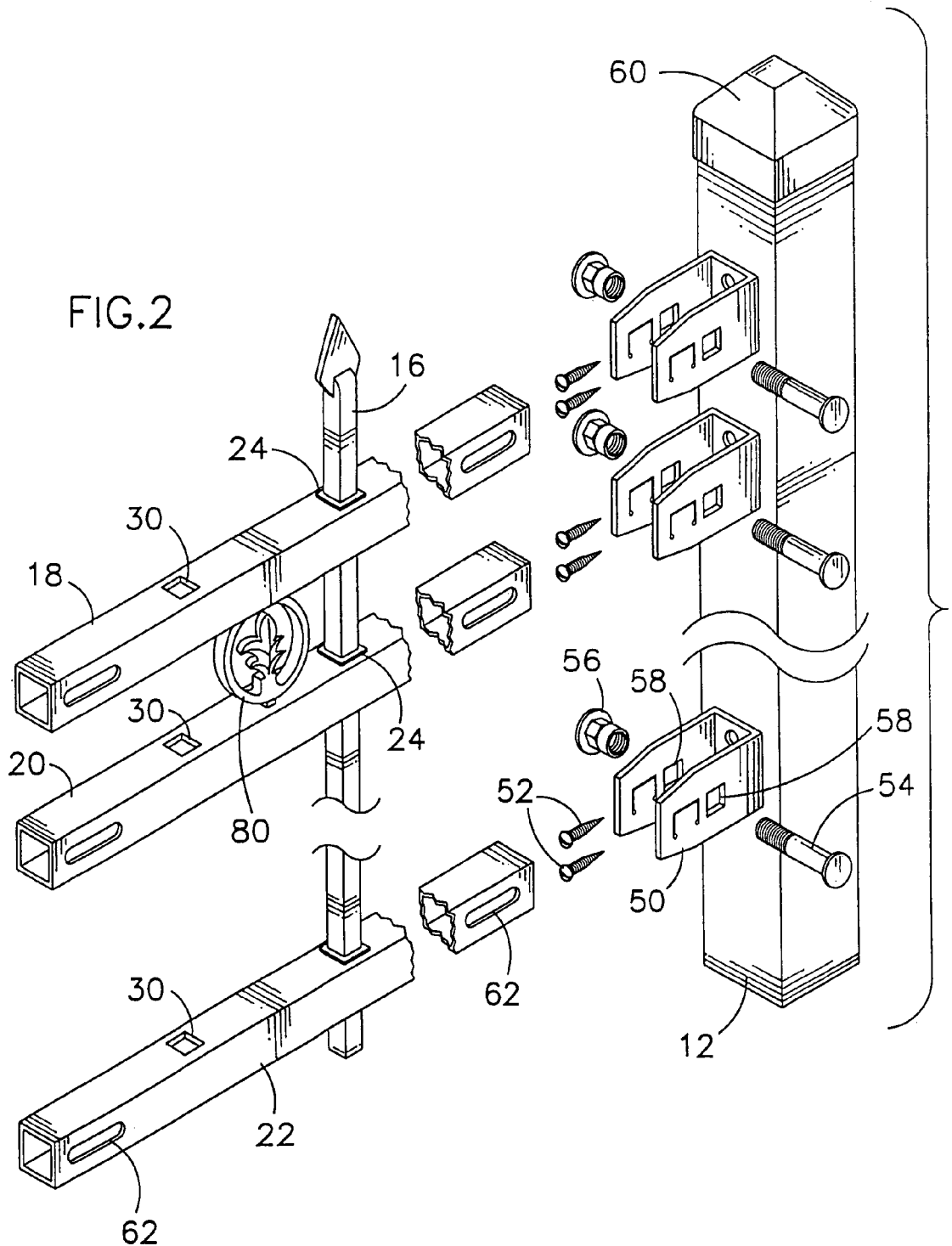
FIG. 2 is an enlarged exploded perspective view of the present invention modular picket fence shown in FIG. 1.

Referring to FIGS. 1 and 2, each of the vertical posts 12 and 14 are substantially identical, and to the extent they are, only one will be described in detail in the interest of brevity. At least three U-shaped metal brackets 50 are attached to the post 12 and located at three different locations along the length of the post 12, where the brackets 50 of each post face each other as shown in FIG. 1. Each bracket 50 is held against the inner wall or surface of the post 12 by at least two screws fasteners 52 which are threadedly engaged to the bracket 50 and the post 12. As depicted in FIG. 2, the ends of the rails 18, 20 and 22 are removably attached between the posts 12 and 14 by the U-shaped metal brackets 50, which receive and retain the rails thereto by using bolts 54 and nuts 56. Each bolt 54 is inserted through the hole 58 on one side of the bracket 50 and then inserted through a slotted adjustment aperture 62 of the rail for allowing a horizontal adjustment of the rails. An ornamental cover or cap 60 is inserted in the upper end of the vertical post 12 for decorative and sealing purposes.

Each of the horizontal rails 18, 20 and 22 are substantially identical, and to the extend they are, only one will be described in detail in the interest of brevity. The rail 18 has a plurality of longitudinally equally spaced apart vertically aligned non-circular apertures 30, preferably four-sided apertures for receiving the plurality of non-circular pickets 16, preferably four-sided pickets. The non-circular apertures 30 are being of shape and size equal to the cross sectional shape and size of the pickets 16 such that the pickets 16 may be inserted therethrough. The rail 18 also has two slotted apertures 62 extending through the side of rail and located at opposite ends.

Figure 5A:
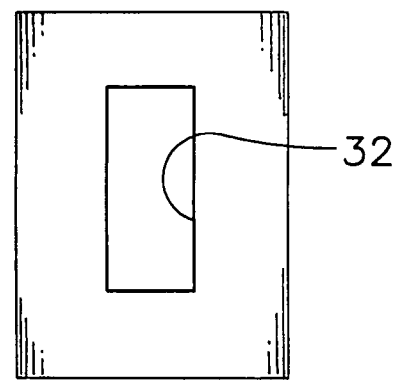
FIG. 5(a) is a plan view of a preferred embodiment of a locking slotted aperture in accordance with the present invention.

As shown in FIGS. 1 and 2, there are provided ornamental caps 24 for each aperture 30 on the rails 18, 20 and 22, and which is slidable on the picket 16 to position the ornamental cap 24 for covering and sealing the aperture 30 when the pickets 16 are in a locking position. The pickets 16 have a uniform square cross-section and have at least one transverse upper locking slotted aperture 32 and at least one transverse lower locking slotted aperture 34 extending therethrough (see FIG. 3) and located along the length of the picket 16 and cooperating with the rails 18 and 22 for precluding movement of the pickets 16 with respect to the rails 18, 20 and 22. The upper and lower locking slotted apertures 32 and 34 are generally rectangular shape as shown in FIG. 5(a). Each picket 16 is held in position by at least two H-shaped locking clips or means 40 (see FIG. 3).

Figure 5B:
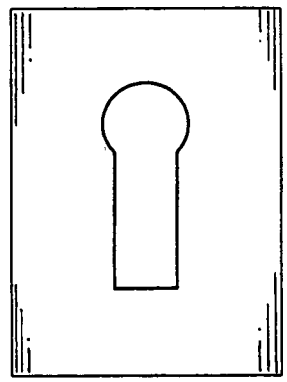
FIG. 5(b) is a plan view of an alternative embodiment of a locking slotted aperture in accordance with the present invention.
Figure 5C:
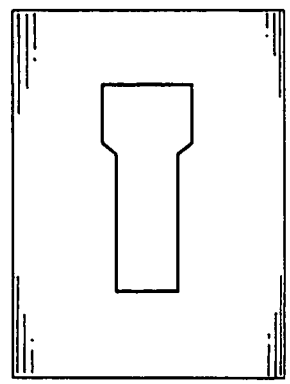
FIG. 5(c) is a plan view of still another alternative embodiment of a locking slotted aperture in accordance with the present invention.

It will be appreciated that the upper and lower locking slotted apertures 32 and 34 are not limited to the rectangular shape illustrated in FIG. 5(a). It is emphasized that while the rectangular shape of the locking slotted aperture is preferred, it is also within the spirit and scope of the present invention to have a plurality of different shapes for the locking slotted apertures as shown in FIGS. 5(b) and 5(c).

Figure 4:
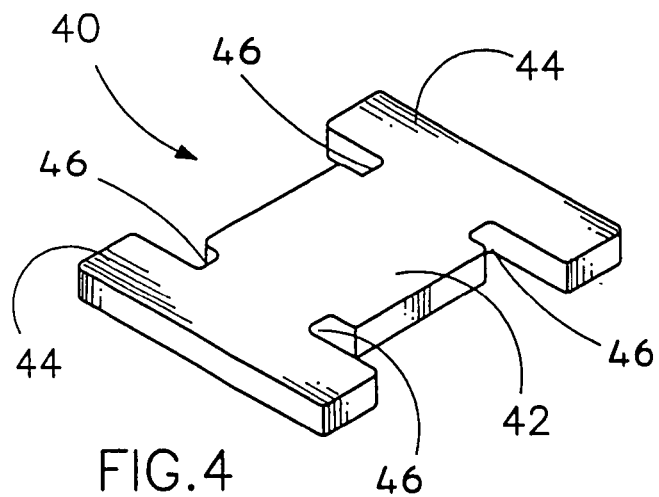
FIG. 4 is an enlarged perspective view of one of the plurality of H-shaped locking clips in accordance with the present invention.

Referring to FIGS. 3 and 4, there is shown the H-shaped locking clip or means 40 that includes a middle section 42 and two leg sections 44 which are formed at opposite ends of the middle section 42. The middle section 42 and the two leg sections 44 form four separate recesses 46 at locations where the middle section 42 and the two leg sections 44 are connected together. The H-shaped locking clip 40 is installed by having one of the leg sections 44 inserted into the locking slotted aperture, where the middle section 42 is concealed within the locking slotted aperture and the two leg sections are outside of the slotted aperture as shown in FIG. 3.

Referring to FIGS. 6(a)–6(e), in order to assemble the modular fence 10, the two vertical posts 12 and 14 are positioned at remote locations, where the brackets 50 of each post face each other as shown in FIG. 6(a). The pickets 16 are respectively inserted through the apertures 30 in the upper rail 18 and then II inserted through the apertures 30 in the lower rail 22 as shown in FIG. 6(b). The pickets 16 are thereby in the assembly position as shown. The ends of the upper rail 18 are then attached to the bracket 50 of each post as shown. Each H-shaped locking clip 40 is respectively inserted into each upper and lower locking slotted apertures 32 and 34 of each picket 16 as shown in FIGS. 6(c) and 6(d), where the middle section 42 is located within the slotted locking aperture while the leg sections 44 are located external to the picket 16 as shown in FIG. 3. The upper H-shaped locking clips 40 engage against the upper surface or wall of the upper rail 18 (see FIG. 6(c)) while the lower H-shaped locking clips 40 engage against the lower surface or wall of the lower rail 22. The ends of the lower rail 22 are then attached to the bracket 50 of each post to provide a finish product as shown in FIG. 6(e).

In the locking position, the H-shaped locking clips 40 frictionally abut the exterior walls of the rails, thereby preventing vertical displacement of the pickets 16. Once the pickets 16 are in the locking position, ornamental caps 24 are pushed downwardly such that the ornamental caps 24 are respectively inserted into the apertures 30 to form a tight smooth joint between picket and rail, thereby further preventing picket displacement, and preventing erosion of the joint through environmental wear and tear. Each picket is inserted and locked into place in the same manner.

The present invention may further include ornaments 80 which can be used with the first arrangement of the present invention. These ornaments 80 are attached to and between the pair of horizontal upper rails 18 and 20 as shown in FIGS. 1, 2 and 6(g) for decorative purposes.

Referring to FIG. 6(f), in this arrangement of the present invention, the modular picket fence is assembled as shown in FIG. 3.

The modular fence further includes bolts and nuts, where each bolt is inserted through a respective horizontal rail and picket for further securing the pickets to the rails.

The present invention conforms to conventional forms of manufacture or any other conventional way known to one skilled in the art.

Figure 7:
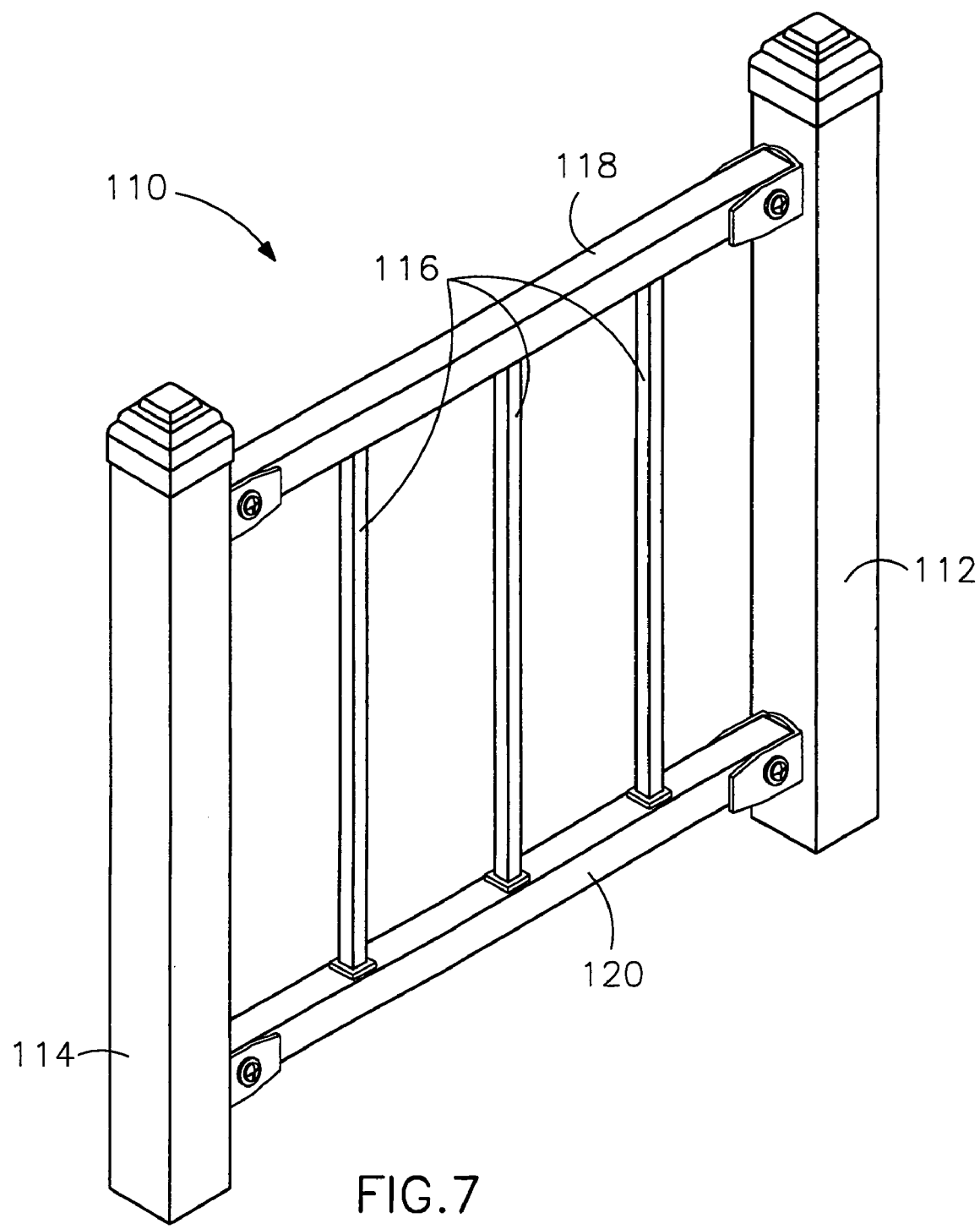
FIG. 7 is a perspective view of another alternative embodiment of a fully assembled modular picket fence in accordance with the present invention.

Referring to FIG. 7, there is shown at 110 another alternative embodiment of the present invention modular picket fence. This alternative embodiment of the present invention modular picket fence 110 comprises a pair of hollow vertical posts or columns 112 and 114 positioned to be secured to a support surface or any other suitable surface, a plurality of hollow vertically disposed pickets or poles 116, and a pair of spaced apart elongated hollow horizontal rails 118. In this example shown, the posts 112, 114, the pickets 116, and the rails 118 each has a square or rectangular shaped cross section configuration, but obviously may be of other cross-sectional configuration as desired.

In addition, for clarity purposes, only three vertical pickets 116 are shown. It will be appreciated that the vertical pickets 116 are not limited to the number of pickets illustrated in FIG. 7. It is emphasized that while three vertical pickets 116 are depicted, it is also within the spirit and scope of the present invention to have greater or smaller number of vertical pickets 116.

Figure 8:
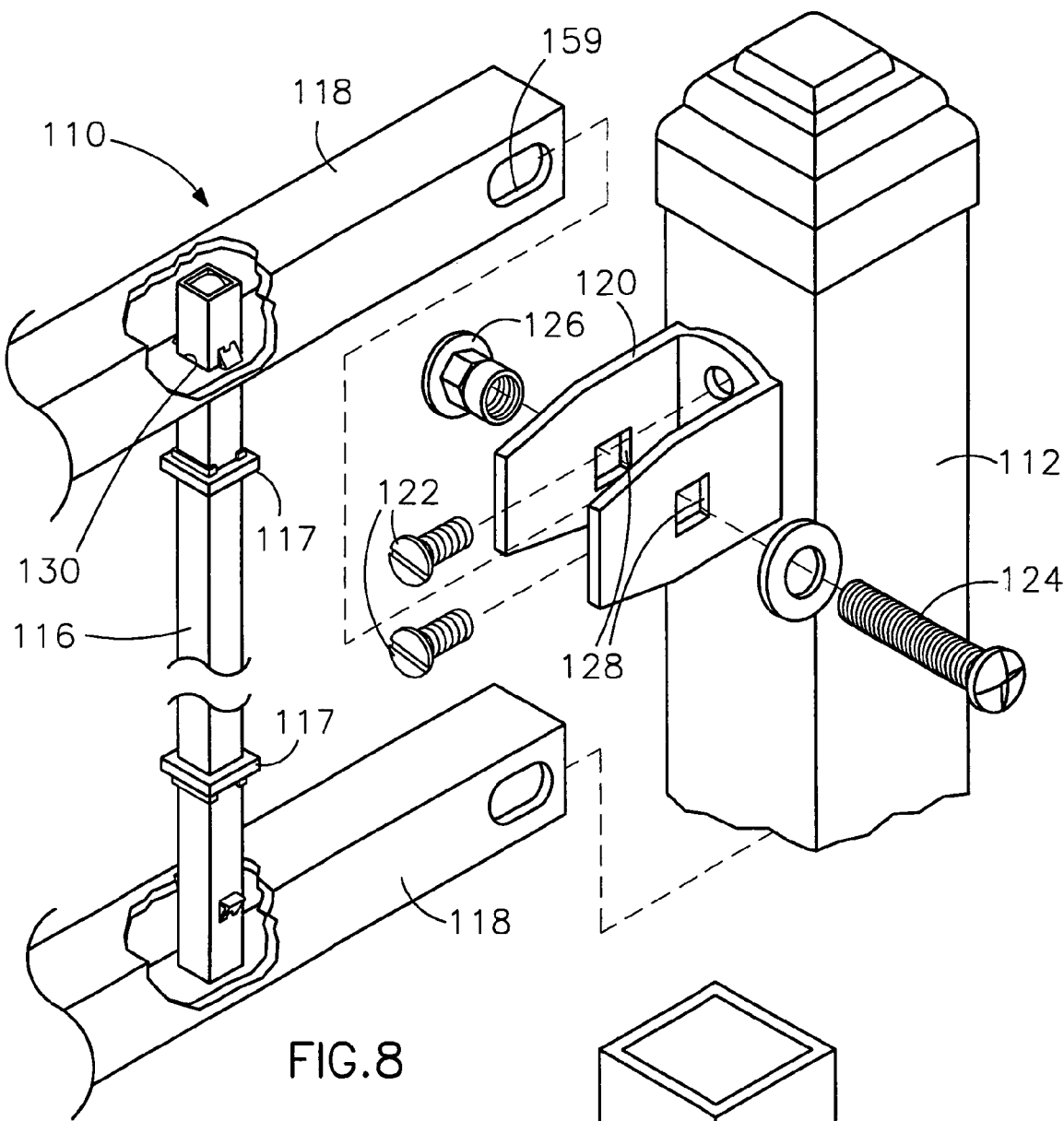
FIG. 8 is an exploded partial perspective view of the alternative embodiment of the present invention modular picket fence.
Figure 9A:
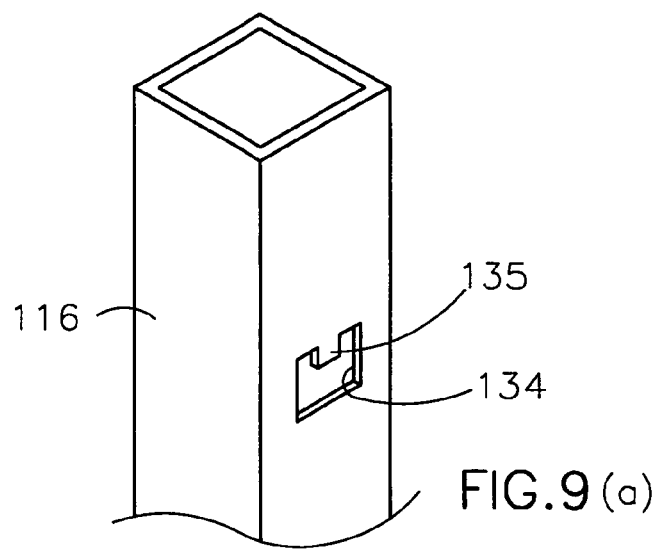
FIG. 9(a) is a partial perspective view of the top portion of a picket used in the alternative embodiment of the present invention modular picket fence.
Figure 10A:
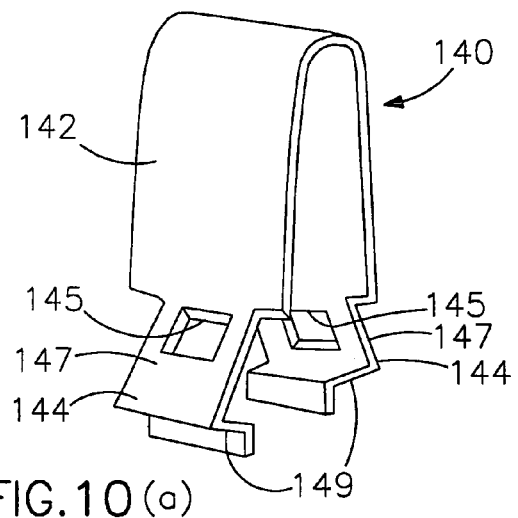
FIG. 10(a) is a perspective view of one of the preferred embodiments of the spring clip used in the alternative embodiment of the present invention modular picket fence.
Figure 9B:
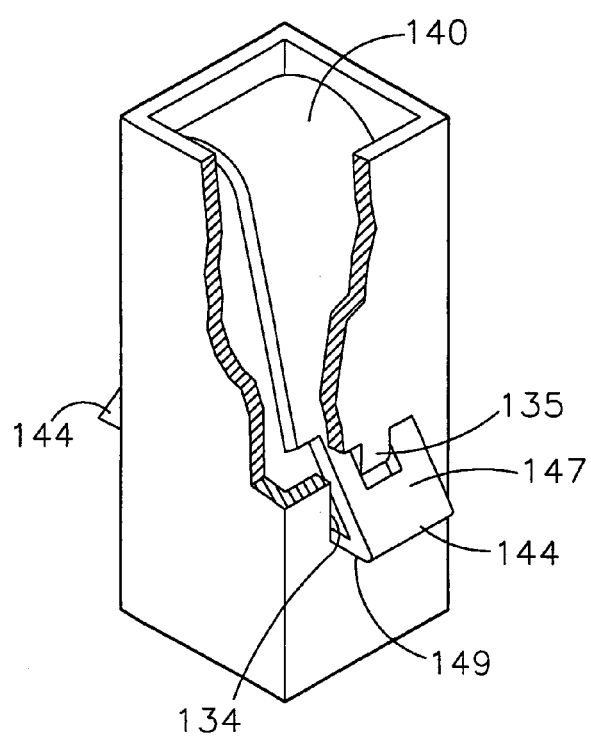
FIG. 9(b) is a partial perspective view of the top portion of a picket with a spring clip assembled therein.
Figure 10B:
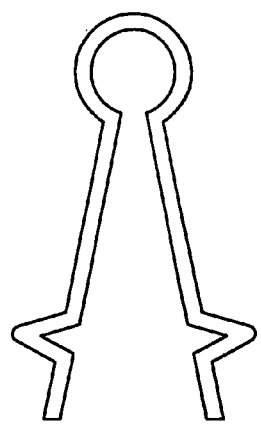
FIG. 10(b) is a side elevational view of another preferred embodiment of the present invention spring clip.
Figure 10C:
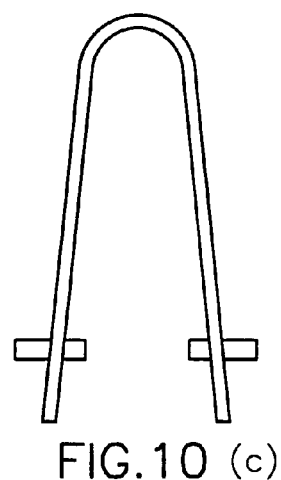
FIG. 10(c) is a side elevational view of still another preferred embodiment of the present invention spring clip.
Figure 10D:
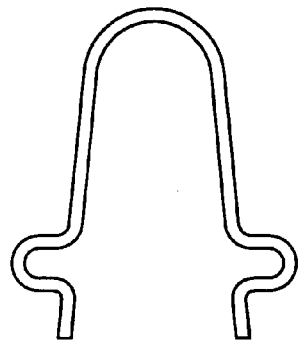
FIG. 10(d) is a side elevational view of still another preferred embodiment of the present invention spring clip.

Referring to FIGS. 7 and 8, each of the vertical posts 112 and 114 are substantially identical, and to the extent they are, only one will be described in detail in the interest of brevity. A U-shaped metal bracket 120 is attached to the post 112 by screws 122 for removably attaching the proximal end of rail 118 by fastening bolts 124 and nuts 126 through the holes 128 on the U-shaped bracket 150 and also through the slotted aperture 159 at the proximal end of the rail 118.

Each of the horizontal rails 118 and 120 are substantially identical, and to the extent they are, only one will be described in detail in the interest of brevity. The rail 118 has a plurality of non-circular apertures 130, preferably four-sided apertures for receiving the plurality of pickets 116, preferably four-sided pickets.

Figure 12:
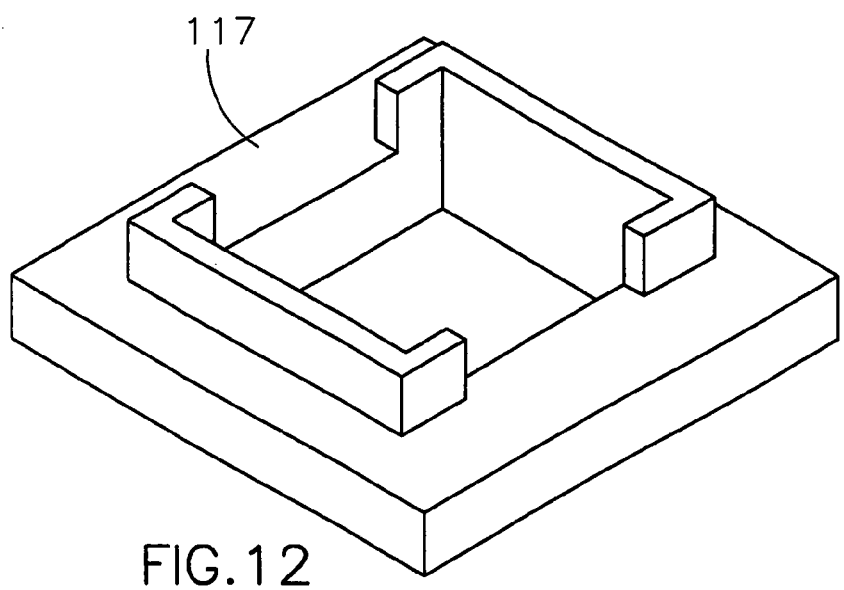
FIG. 12 is a perspective view of one of the preferred embodiments of the sealing cap used in the alternative embodiment of the present invention modular picket fence.

As shown in FIGS. 8 and 12, there are provided sealing caps 124 for each aperture 130 on the rails 118 and which is slidable on the picket 116 to position the sealing cap 124 for covering and sealing the aperture 130 after the pickets 116 are assembled.

As shown in FIGS. 8, 9(a), 9(b) and 10, at the end portion of each picket 116 there is provided two oppositely aligned transverse apertures 134 each having a locking tongue 135. A generally reversed U or V-shaped spring clip 140 is inserted at the end portion of the picket 116.

The spring clip 140 may be made of metal or other suitable material with a memory to return to its pre-deformed shape after being compressed or squeezed. The spring clip 140 has a generally reversed U or V-shaped configuration with a bent middle portion 142 and two opposite end portions where there are provided outwardly protruding stoppers 144 which, when the spring clip 140 is inserted into the end portion of picket 116, will extend outwardly through the transverse apertures 134 thereof.

Each stopper 144 has an opening 145 which receives the locking tongue 135 of the picket 116, thereby preventing movement of the spring clip 140 inside the picket 116.

Each stopper 144 of the spring clip 140 has a ramp side 147 and a right-angle side 149. As the end portion of the picket 116 (with the spring clip 140 inserted) is inserted through the aperture 130 of the rail 118, the ramp side 147 of the spring clip 140 will engage with the edges of the aperture 130 of the rail 118 first, causing the spring clip 140 to be compressed, thereby allowing end portion of the picket 116 to be inserted further through the aperture 130.

Once the ramp side 147 of the spring clip 140 passes the edges of the aperture 130 of the rail 118, the spring clip 140 will expand back, causing the ramp side 147 of the spring clip 140 to engage and rest upon the interior surface of the hollow rail 118 (as shown in FIG. 8).

Once the stoppers 144 of the spring clip snap in place inside the aperture 130 of the rail 118, the end portion of the picket 116 is locked therein and cannot be removed. This mechanism secures the picket 116 to the rail 118.

Another variation on the design of the modular fence is shown as 10(b) in FIG. 6(a).

Other similar embodiments of the present invention spring clip are shown in FIGS. 10(b)–10(e).

Figure 11:
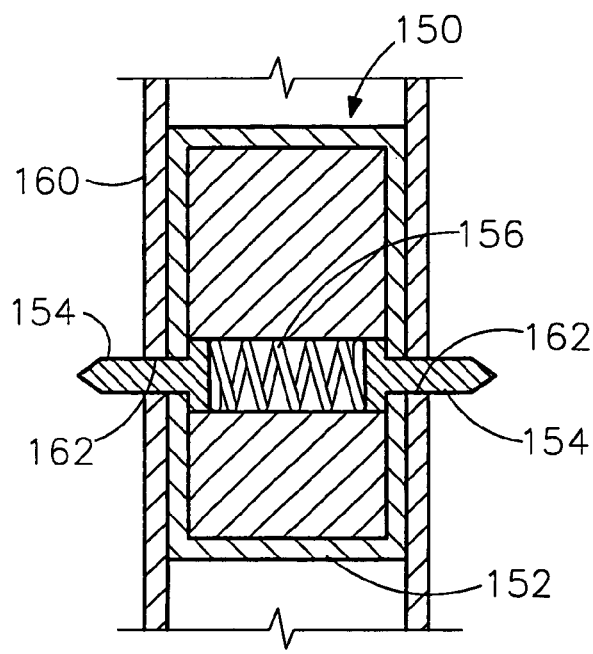
FIG. 11 is a cross-sectional side view of an alternative embodiment of the present invention spring clip.
Figure 10:
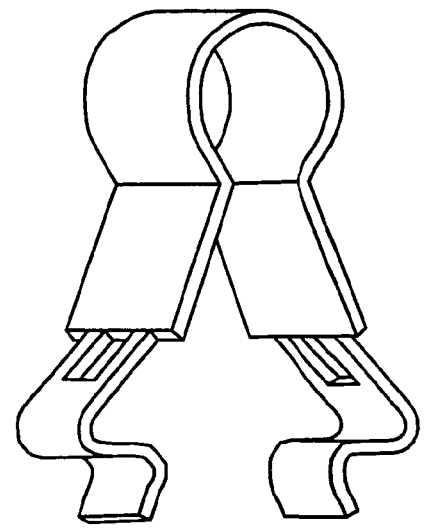
FIG. 10(e) is a side elevational view of still another preferred embodiment of the present invention spring clip.

An alternative embodiment of the present invention spring clip is shown in FIG. 11. In this alternative embodiment, spring clip 150 includes a hollow block 152 which is inserted into the end portion of a picket 160. Two oppositely disposed stoppers 154 are assembled inside the clip 150 and biased by an internal spring 156. The stoppers 154 are extending through corresponding openings 162 at the end portions of the picket 160. The stoppers 154 can be compressed inwardly to allow the end portion of the picket 160 to be inserted into the aperture 130 of the rail 118. Once inside the rail 118, the stoppers 154 will extend back, which secures the end portion of the picket 160 to the rail 118.

Of course the present invention is not intended to be restricted to any particular form or arrangement, or any specific embodiment, or any specific use, disclosed herein, since the same may be modified in various particulars or relations without departing from the spirit or scope of the claimed invention hereinabove shown and described of which the apparatus or method shown is intended only for illustration and disclosure of an operative embodiment and not to show all of the various forms or modifications in which this invention might be embodied or operated.

The present invention has been described in considerable detail in order to comply with the patent laws by providing full public disclosure of at least one of its forms. However, such detailed description is not intended in any way to limit the broad features or principles of the present invention, or the scope of the patent to be granted. Therefore, the invention is to be limited only by the scope of the appended claims.

The invention claimed is:
1. A modular picket fence, comprising:
   a. at least two spaced apart vertical posts being adaptable to be secured to a support surface;
   b. at least two spaced apart upper and lower hollow horizontal rails, each horizontal rail having, an enclosed upper surface with a plurality of spaced apart apertures and an enclosed lower surface with a plurality of spaced apart apertures, a respective aperture in an upper surface aligned with a respective aperture in a lower surface;

c. means for attaching said at least two horizontal rails to said at least two vertical posts such that the apertures on said at least two horizontal rails are aligned;

d. a plurality of spaced apart vertical pickets having a hollow interior and secured, in mutually parallel relationship to each other to said at least two horizontal rails, each said vertical picket having two opposite end portions respectively inserted into said aligned apertures of said at least two horizontal rails, each said end portion of each said vertical picket having two oppositely disposed and aligned transverse apertures each aperture having a locking tongue extending into the aperture;

e. means for locking said each end portion of said each vertical picket to one of said at least two horizontal rails when said end portion is inserted into a respective aligned set of corresponding apertures of said respective one of said at least two horizontal rails, said locking means each comprising a one-piece generally U-shaped spring clip having a bent middle portion and two opposite end portions each having an outwardly protruding stopper, each stopper having a ramp side having an opening which receives the locking tongue and a right-angle each side, said spring clip respectively inserted into said each end portion of said each vertical picket with said opposite stoppers of said spring clip secured to the vertical picket by the locking tongue received within the opening in the ramp side and each ramp side respectively protruding through said two oppositely disposed and aligned transverse apertures of each said end portion of each said vertical picket;

f. wherein when said each end portion of each said vertical picket is inserted into one of said corresponding aligned sets of apertures of said respective one of said horizontal rails, said stoppers of said spring clip are inserted in said each end portion of each said vertical picket and extend through said transverse apertures of said each end portion of each said vertical picket such that for the upper horizontal rail the locking tongue engages the opening in the ramp side of the stopper so that the ramp side of the stopper rests upon the interior of the lower surface and the right angle side is compressed against the interior wall of the vertical picket and for the lower horizontal rail the locking tongue engages the opening in the ramp side of the stopper so that the ramp side of the stopper rests underneath the interior of the upper surface and the right angle side is compressed against the interior wall of the vertical picket such that vertical movement of each said vertical picket relative to said respective one of said horizontal rails is prevented.

2. The modular picket fence in accordance with claim 1, further comprising a sealing cap for covering each spaced apart apertures of said horizontal rails after said fence is assembled.

3. The modular picket fence in accordance with claim 1, wherein said attaching means includes bolts and nuts.

* * * * *